May 3, 1932.    R. BERINGER    1,856,275
CHANGE SPEED TRANSMISSION MECHANISM FOR MOTOR VEHICLES
Filed Nov. 30, 1925    2 Sheets-Sheet 2
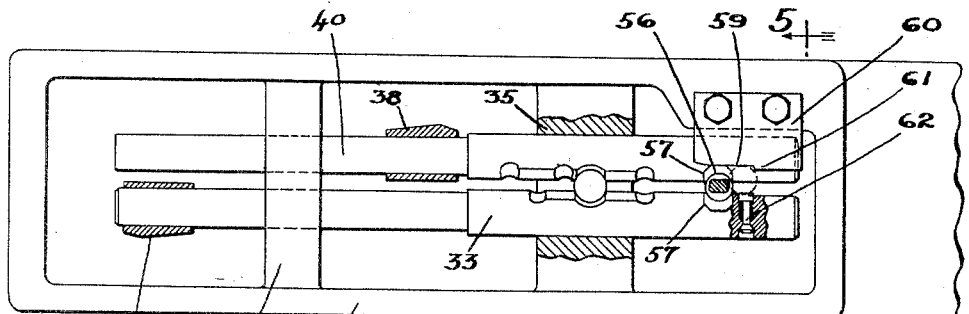
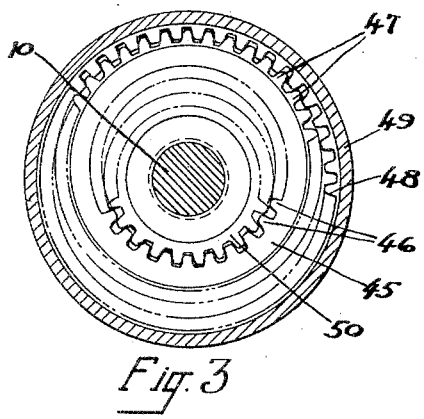
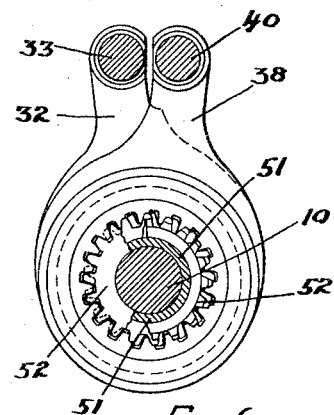
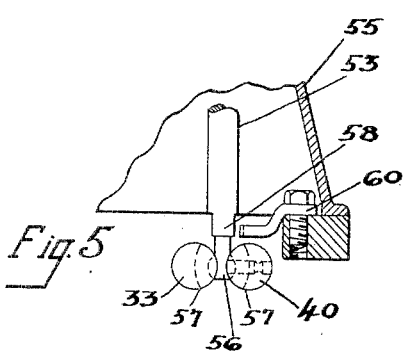
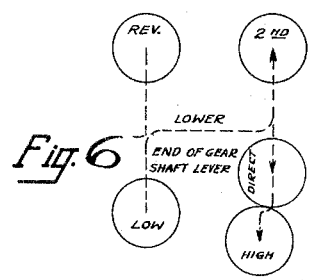
Inventor
ROSCOE BERINGER
By Blackmore, Spencer & Flint
Attorneys Patented May 3, 1932

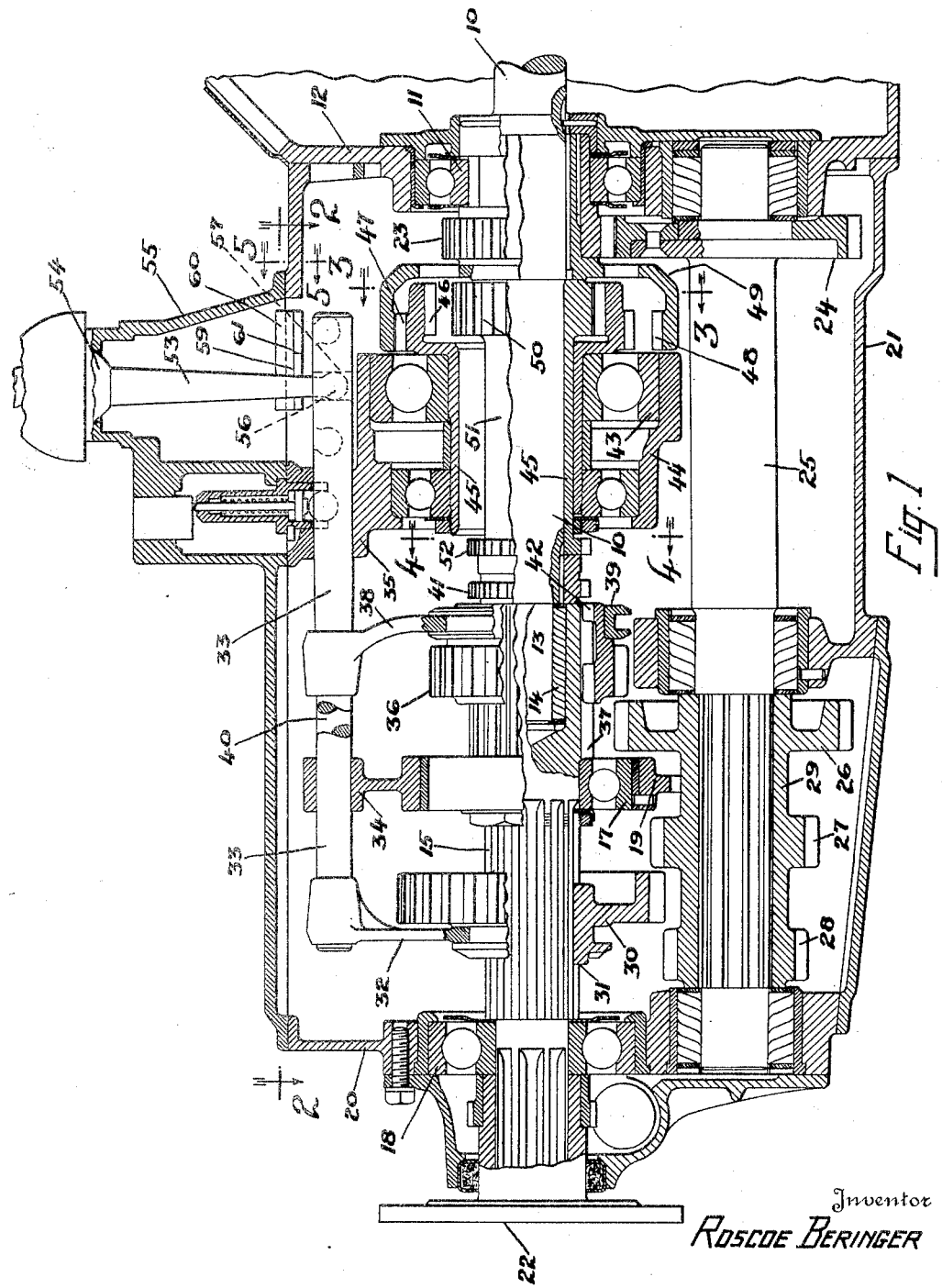

1,856,275

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

CHANGE SPEED TRANSMISSION MECHANISM FOR MOTOR VEHICLES

Application filed November 30, 1925. Serial No. 72,334.

My invention relates to change speed mechanism designed for use in connection with motor driven vehicles to accomplish the driving thereof at various speeds relative to the speed of the engine which drives the vehicle; and the object thereof is to provide change speed gearing wherein and by the use of which the propeller shaft which drives the rear wheels of the vehicle may be driven at a higher speed than that of the engine shaft, while at the same time providing for various speeds corresponding with and below that of the engine crank shaft.

Heretofore in change speed gearing of the class contemplated the highest speed at which the propeller shaft could be driven corresponded, usually, with the speed of the engine; such speed being attained when the engine shaft is coupled directly to the transmission shaft, thereby bringing about the condition of the parts commonly designated as direct driving. It is desirable, however, under various conditions of travel that the propeller shaft shall be driven faster than the engine shaft; as the conditions commonly present are such that the engine is properly balanced, and runs with a minimum of vibration at a certain speed which is ordinarily less than the speed at which it is desirable that the propeller shaft shall be driven. My improved transmission mechanism, therefore, provides change speed gearing in which the engine may operate at a predetermined and comparatively low speed at which it will be in proper balance, and under which condition vibration will be at a minimum; while at the same time a higher speed than that of the engine is provided for in the propeller shaft which drives the rear wheels. At the same time my improved transmission mechanism provides for a sufficient range of speeds of the propeller shaft at and below the speed at which the engine runs, thereby enabling the vehicle to be driven at a number of comparatively low speeds, as well also as at a speed which is above that of the engine shaft.

With the above and other objects of invention in view my invention consists in the improved change speed transmission mechanism illustrated in the accompanying drawings, described in the following specification, and particularly claimed at the end thereof; and in such variations and modifications thereof, within the scope of the concluding claims, as will be obvious to those skilled in the art to which my invention relates.

In the drawings accompanying and forming a part of this specification and wherein the preferred embodiment of my invention is illustrated:

Figure 1 is a view showing my improved change speed transmission mechanism upon a substantially vertical plane extending longitudinally thereof; the engine end being at the right, and the propeller shaft being connected with the left hand end thereof.

Figure 2 is a view showing the gear shifting elements of my improved transmission mechanism as seen from a plane indicated by the line 2—2, Figure 1, looking down.

Figure 3 is a fragmentary view showing certain of the gears of my improved transmission mechanism; the view being taken upon a vertical transverse plane indicated by the line 3—3, Figure 1, looking toward the left.

Figure 4 is a fragmentary view showing a section taken upon a vertical transverse plane indicated by the line 4—4, Figure 1, looking also to the left.

Figure 5 is a fragmentary view showing certain details of my invention, and

Figure 6 is a diagram showing the positions taken by the usual gear shifting lever in effecting the shifting of the gears to procure various speeds, and for reverse driving of the vehicle.

Referring now to the drawings, the reference numeral 10 designates the main driving shaft of my improved transmission mechanism, the same being connected with the engine which drives the vehicle so as to be driven thereby; and the forward end of which shaft is rotatably supported in a ball or other type of bearing 11 which in turn is supported in an opening in the wall 12 of a casing which encloses the usual clutch mechanism. This driving shaft extends rearward, and the rear end 13 thereof is supported in the usual way in a bearing 14 housed in a recess in the right hand end of the transmission shaft 15. This transmission shaft is commonly additionally supported in ball or other bearings at 17 and 18 carried by a transverse web 19 and in an opening in the rear wall 20 of the usual casing 21, which encloses the transmission mechanism as a whole, and is arranged in alignment with the said main driving shaft in the more usual types of change speed gearing. The transmission shaft 15 extends beyond the rear wall 20 and is provided with a flange or other type of coupling 22 which is adapted to be connected with the front end of the usual propeller shaft which extends to the rear axle of the vehicle and through which the rear wheels thereof are driven.

The engine driven shaft 10 is provided with a pinion 23 fast thereupon and which in the form of my invention illustrated is in constant mesh with a gear 24 fast upon the front end of a counter or jack shaft 25 arranged to one side of the main driving and transmission shafts; the two ends of the counter shaft being supported in bearings carried by the transmission casing and by the rear wall 12 of the clutch housing in the form of my invention illustrated. This counter shaft is also shown as supported in a third intermediate bearing inside the transmission casing in order to strengthen the construction.

Secured to the counter shaft 25 so as to rotate therewith is a gear member made up of three separate gears or pinions 26, 27 and 28 shown as integral with a sleeve 29 although these gears may be formed separate from one another and may be separately secured to the counter shaft 25 if desired.

The pinion 28 is for reverse driving of the vehicle; and the same meshes with an intermediate gear not shown and with which a large gear 30 may be made to mesh. This gear 30 is splined upon the transmission shaft 15, as shown at 31, and is movable longitudinally thereupon by a yoke 32 carried by a gear shift rod 33 slidable in bearings 34, 35 in the transmission housing. When this gear 30 is in its left hand position reverse driving is secured through the counter shaft 25, the gear 28 and an idler gear not shown, and the said gear 30 in the usual manner of change speed transmission mechanism. This gear 30 is also movable to the right to an extent sufficient to bring into engagement with the pinion 27 upon the counter shaft 25, to thereby provide for slow speed forward driving through the counter shaft and the said gear, as will be appreciated. The second or intermediate forward driving speed is provided for by a combined gear and clutch member having teeth 36 and which member is slidable upon the transmission shaft 15 and is splined thereto at 37; said member being moved upon the right hand end of the transmission shaft whereby it is carried by a yoke 38 which engages a shifting ring 39 carried by said member and which, while shown separately therefrom, may obviously be integral with the gear member. The yoke 38 is carried by a second gear shifting rod 40 slidable also in the bearings 34, 35 in accordance with the usual practice in such devices. When the gear and clutch member is in its left hand position its teeth 36 mesh with the gear 26 upon the counter shaft 25, whereby the transmission shaft will be driven from the counter shaft as will be appreciated.

Fast upon the rear end of the engine shaft 10 is a clutch member 41 comprising a circumferentially arranged series of lugs which are adapted to engage a corresponding series of internal lugs 42 upon a projecting part or sleeve of the combined gear and clutch member 36; and when these two sets of lugs are brought into engagement with one another by moving the said member to the right, direct driving of the transmission shaft 15 from the main driving shaft 10 will obviously occur.

Rotatably supported in ball or other bearings 43, which in turn are supported in an annular support 44 inside the transmission casing is a sleeve 45, this sleeve being arranged eccentric to the driving shaft 10 and the right hand end thereof being extended radially and formed into an internal gear 46 and as an external gear 47, the teeth of these annular gears being shown as partially overlapping in the embodiment of my invention illustrated. The external teeth 47 mesh with the internal teeth 48 of an annular cup-shaped gear 49 which is fast upon and rotates with the engine shaft 10; the same being shown as integral with the gear 23 hereinbefore referred to. The internal teeth 46 of the sleeve member 45 mesh with a gear 50 upon one end of a second sleeve 51 which is rotatable upon the main driving shaft 10 and whereby the said sleeve is driven; and the other end of this sleeve 51 is provided with a clutch member 52 made up of a series of lugs and similar in all respects to the clutch member 41 hereinbefore referred to.

The pinion 36 in addition to being movable rearward into engagement with the gear 26 for intermediate or second speed driving, and movable forward so as to cause the lugs 42 thereof to engage the clutch member 41 to thereby provide for direct driving of the transmission shaft 15 at the speed of the engine, is movable also farther forward or toward the right in Figure 1 so as to bring its lugs 42 into engagement with the clutch lugs 52 upon the rear end of the sleeve member 51. When this has been done it will be appreciated that the pinion and the transmission shaft 15 upon which it is slidable will be driven from the sleeve 51 through the clutch member 52 and the lugs 42; and inasmuch as said sleeve is itself driven through the pinion 50, the double annular gear 46, 47 and the cup-shaped gear 49, which is fast upon the engine shaft 10, the said shaft 15 will be driven at a higher speed than it is driven through the clutch member 41 and the lugs 42. As a matter of course this higher speed comes about because of the relative sizes of the gears 49, 46, 47 and 50, the result being, as will be appreciated, that the transmission shaft 15 and the propeller shaft extending from the coupling member 22 to the rear axle is driven at a higher speed than that of the engine or main driving shaft 10.

The gear shifting rod 33 whereby the gear 30 is shifted to secure backward and slow speed forward driving of the vehicle operates in the usual way that such rods operate in change speed mechanisms, and the same is operated by the usual gear shifting lever 53 which is supported at 54 in a universal joint at the upper end of a pedestal 55 extending upward from the transmission casing 21; the gear shifting lever being movable forward and backward to shift the gear 30, and movable also sidewise to move its lower end 56 out of engagement with said rod 33 and into engagement with the rod 40 whereby the combined gear and clutch member 36, 39 is moved upon the right hand end of the transmission shaft 15 to secure intermediate or second speed and high speed due to direct coupling of the driving shaft to the transmission shaft, and also a higher speed of the transmission shaft as hereinbefore explained; the two rods having recesses 57 into one or the other of which the lower end of the gear shift member may be moved by sidewise movement of the said member when the rods are in a neutral position and all the gears out of mesh, as is usual in change speed transmission mechanisms of the class to which my invention relates.

In the shifting of the gears the rod 33 is moved back and forth in the usual manner, as indicated in the diagram Figure 6 which represents the movement of the lower end of the lever 53, to secure reverse and slow speed as hereinbefore explained. When the lower end of the gear shifting lever is moved into the recess 57 of the rod 40 rearward movement of the rod 40 to secure driving at an intermediate or second speed is the same as the ordinary movement in transmission mechanisms and forward movement of the said rod, which is accompanied by a movement of the lugs 42 into interlocking engagement with the clutch member 41 to thereby secure direct driving, is also like unto the movement which occurs in ordinary change speed transmission mechanism. At the end of this forward or right hand movement of the rod 40, however, that is after the lugs 42 have been engaged with the clutch member 41, a portion 58 of the gear shifting lever just above the lower end 56 thereof which during such movement has moved along a straight portion 59 of a guide and stop member 60 secured to the transmission casing 21, comes against a slight projection or shoulder 61 upon said member whereby further movement of the lower end of said lever to the right, referring to Figure 1, is arrested. At the end of this movement, that is when the lower end of the lever comes into engagement with the shoulder or stop 61, said lower end lies opposite a spring pressed plunger 62 housed in a recess in the rod 33 and thereafter, assuming that the gearing is to be farther manipulated to secure driving of the transmission shaft 15 faster than the main driving shaft 10, the lower end of said lever is moved against the spring pressed plunger 62 thereby freeing said lower end from the stop 61 and permitting farther movement of said lower end toward the right; during which movement the shifting rod 40 is moved farther, and the lugs 42 are moved out of engagement with the clutch member 41 and into interlocking engagement with the clutch member 52. During all this movement as will be appreciated the lower end 56 of the gear shifting lever remains in the recess 57 of the rod 40 and, while language has been used implying a positive stopping of the onward movement of the lower end of the gear shifting lever by the shoulder 61, the said shoulder and the plunger 62 form in effect yieldable means for temporarily arresting the right hand movement of the rod 40 between the direct driving and the increased speed or over driving condition of the gearing. This yieldable stop mechanism therefore indicates to the operator by the "feel" of the gear shifting lever when the parts are in a condition for direct driving of the propeller shaft at the same speed as that of the main driving shaft, but at the same time permits him to move the lever quickly through the direct driving position and into the position wherein driving of the transmission shaft at increased speed relative to that of the engine shaft is secured.

Having thus described my invention and explained the operation thereof, I claim and desire to secure by Letters Patent:

1. In change speed transmission gearing for motor driven vehicles, and in combination, a main driving shaft; a transmission shaft arranged in alignment with said driving shaft; a counter shaft arranged to one side of said main driving and transmission shafts; gearing whereby said counter shaft is driven by said main driving shaft; a plurality of cooperating pairs of gears carried by said counter and transmission shafts and whereby the latter may be driven at a plurality of speeds by said counter shaft; a clutch member carried by said main driving shaft; a second clutch member arranged adjacent said first mentioned clutch member; gearing whereby said second mentioned clutch member is driven by and at a higher speed than that of said main driving shaft; and a combined gear and clutch member slidable upon and non-rotatably connected with said transmission shaft and adapted when in one position to mesh with one of the gears upon said counter shaft, and when in another position to interlock with the first mentioned clutch member aforesaid, and when in the third position to interlock with the second mentioned clutch member aforesaid, to thereby secure the driving of said transmission shaft through one or the other of said clutch members.

2. In change speed transmission gearing of the class described, a main driving shaft; a sleeve rotatable upon said shaft and having a gear at one end, and a clutch member at its other end; a second rotatable sleeve surrounding said first sleeve and arranged eccentric thereto; a cup shaped gear carried by and fast upon said main driving shaft, and having internal teeth; an annular gear member carried by said second mentioned sleeve and having external teeth meshing with said cup shaped gear, and internal teeth meshing with the gear upon said first mentioned sleeve; a second clutch member carried by said main driving shaft and located adjacent said first mentioned clutch member; a transmission shaft arranged in alignment with said main driving shaft; a counter shaft driven by said main driving shaft; change speed gearing whereby and through which said transmission shaft may be driven at a plurality of speeds from said counter shaft; a combined gear and clutch member slidable upon and non-rotatably connected with said transmission shaft, and the clutch part of which is adapted to engage either one of the two clutch members aforesaid; and a gear upon said countershaft with which the gear part of said combined gear and clutch member is adapted to engage.

3. In change speed transmission gearing of the class described, a main driving shaft; a rotatable sleeve arranged concentric with said shaft and having a gear, and a clutch member; a second rotatable sleeve surrounding said first sleeve and arranged eccentric thereto; a gear carried by and fast upon said main driving shaft, and having internal teeth; an annular gear carried by said second mentioned sleeve and having two sets of teeth one meshing with said last mentioned gear, and the other meshing with the gear upon said first mentioned sleeve; a second clutch member carried by said main driving shaft; a countershaft driven by said main driving shaft; a transmission shaft adapted to be driven by said countershaft; change speed gearing whereby and through which said transmission shaft may be driven at a plurality of speeds from said countershaft; a combined gear and clutch member slidable upon and non-rotatably connected with said transmission shaft, and the clutch part of which is adapted to engage either the clutch member of said first mentioned sleeve or the clutch member carried by said main driving shaft; and a gear upon said countershaft and with which the gear part of said combined gear and clutch member is adapted to engage.

4. In a transmission gearing, a driving shaft, an aligned driven shaft, a driven countershaft, a gear having external and internal teeth eccentrically arranged relative to said aligning shafts, a gear on the driving shaft engaging one of the sets of teeth of said eccentrically arranged gear, a sleeve rotatable about said driving shaft and which sleeve is driven by the other set of teeth of said eccentrically arranged gear, and a combined gear and clutch member operatively associated with and slidable on the driven shaft to clutch said driven shaft to said driving shaft or to said sleeve, said member including a gear adapted to mesh with and to be driven by a gear upon said countershaft.

In testimony whereof I affix my signature.

ROSCOE BERINGER.